March 28, 1939. E. W. MACLEAN 2,152,354
SHOE COUNTER
Filed Feb. 2, 1938
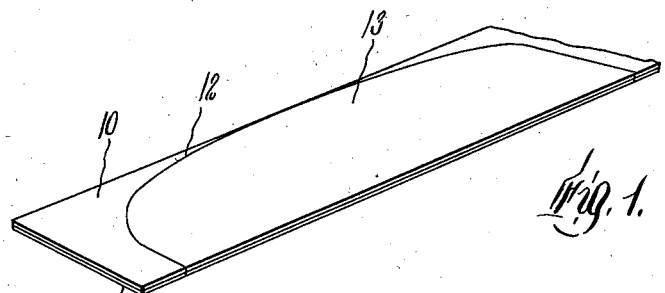
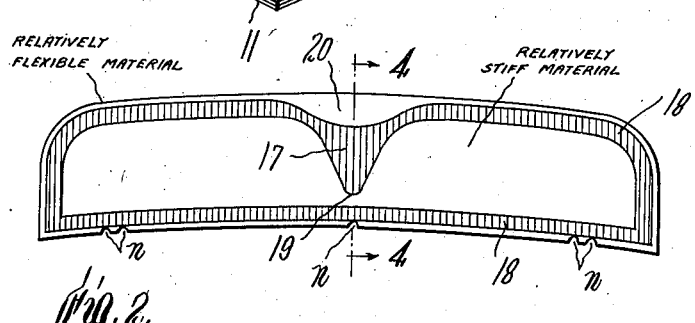
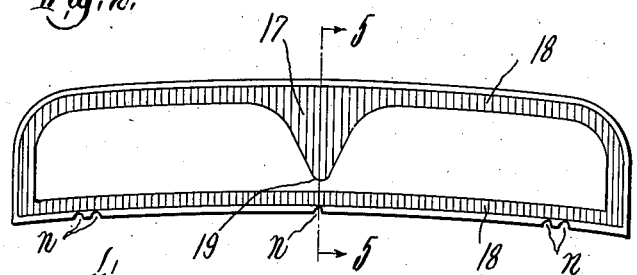
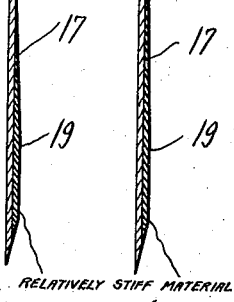
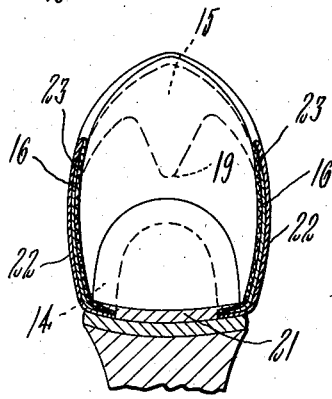
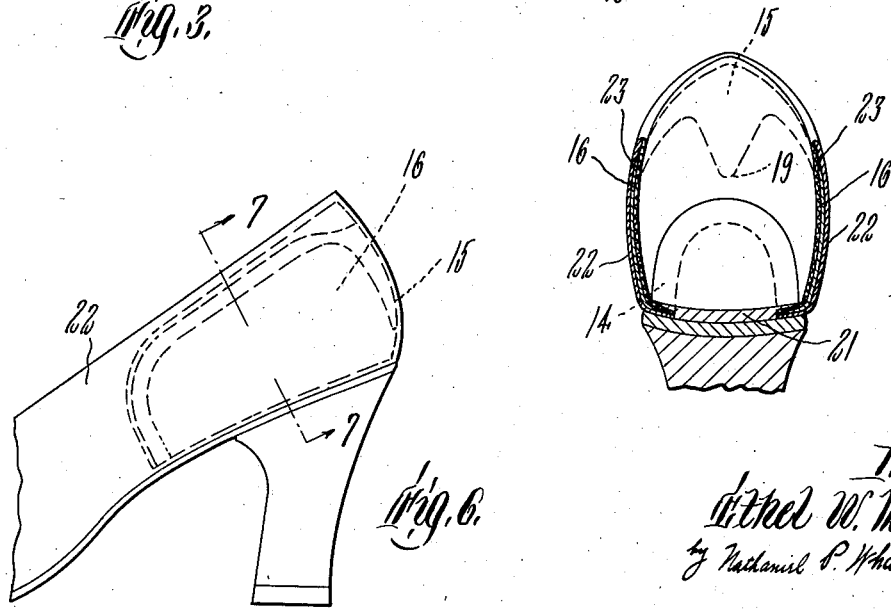
Inventor
Ethel W. MacLean
by Nathaniel P. Wharton
Atty.

Patented Mar. 28, 1939

2,152,354

UNITED STATES PATENT OFFICE 2,152,354

SHOE COUNTER

Ethel W. Maclean, Bayside, Long Island, N. Y., assignor to Brown Company, Berlin, N. H., a corporation of Maine Application February 2, 1938, Serial No. 188,328

6 Claims. (Cl. 36—68)

This invention relates to a shoe counter or counter stiffener and more particularly to one of a composite structure comprising a relatively stiff layer or ply and a relatively flexible layer or ply.

In accordance with the present invention, the counter is skived at its marginal portions and locally at its back wall over a zone extending much farther inwardly than the skived marginal zones, preferably over a relatively narrow back zone extending downwardly from the upper edge to a point removed but a relatively short distance from the usual bottom flange with which the counter is equipped. While not limited thereto, the present invention may be applied to especial advantage in the case of a counter comprising a relatively stiff layer or ply and a relatively flexible layer or ply, for, by skiving on its relatively stiff layer or ply as already indicated, relatively stiff material is removed to a greater extent at the back or center wall of the counter than at its side walls or wings, wherefore, the desired comfort is ensured to the foot where it usually bears with greatest pressure against the counter, namely, at the back or central wall, while the side or end walls of the counter are left sufficiently stiff to prevent the counter as a whole from flexing too readily and thus to preserve the desired shape or lines at the rear-end portion of the shoe.

With the foregoing and other features and objects in view, the present invention will now be described in further detail with particular reference to the accompanying drawing, wherein;

Figure 1 depicts in perspective the cutting of a counter blank from a plied sheet structure composed of relatively stiff and flexible ply materials.

Figure 2 is a plan view of a skived counter blank embodying the present invention.

Figure 3 is a similar view of a slight modification.

Figures 4 and 5 represent vertical sections centrally through the two forms of counter blanks on the lines 4—4 and 5—5 of Figures 2 and 3, respectively.

Figure 6 illustrates in side elevation the rear-end portion of a shoe into which the molded or finished counter hereof has been incorporated.

Figure 7 represents a vertical section transversely through the rear-end portion of the shoe on the line 7—7 of Figure 6.

Plied sheet material for the counter hereof appears in Figure 1 as a strip or band comprising a relatively stiff ply 10 and a relatively flexible ply 11. The strip, which may be of a thickness of, say, about 3 to 4 irons, and be composed of two plies of substantially uniform and equal thickness, is shown as being of a width corresponding to the size of the counter blank to be cut or died out therefrom. The curved line of cutting 12 of a typical counter blank 13 from the strip is depicted in Figure 1; and such a blank may be molded into a finished counter which, as illustrated in Figures 6 and 7, comprises a bottom flange or heel seat 14 from which are upstanding the back wall 15 and the curved side walls or wings 16.

Prior to molding, however, the blank 13 is skived on its relatively stiff ply at its marginal portions and locally at its back wall over a zone 17 extending much farther inwardly or downwardly from the upper edge than the zones of skiving 18 presented by all the skived marginal portions, including the skived bottom or substantially straight edge portion of the counter blank as well as its curved upper edge portions. The skived zone 17, which is of relatively narrow width, may progressively diminish in width toward the bottom edge of the counter and terminate at a point 19 only a short distance above the bottom flange 14.

In the skived counter blanks of Figures 2 and 3, the zones at which stiff ply material is partially removed or cut away is indicated by cross-hatch lines and the relatively narrow feather edge presented by the flexible ply material is shown without cross-hatch lines. When, as appears in Figures 2 and 4, it is desirable to provide a wider feather edge 20 at the center or back of the counter, the angularity or curvature of the plane of skiving from the point 19 to the upper edge of the counter may be made appropriate for such purpose. On the other hand, the plane of skiving from the point 19 to the upper edge of the counter may be sufficiently rounded off at its upper edge portion or marginal zone, as illustrated in Figures 3 and 5, to leave at the center or back of the counter a feather edge of flexible ply material practically no wider than elsewhere in the counter. In other words, the degree to which stiff ply material is removed locally at the back of the counter, and, accordingly, the degree of flexibility created locally at the back of the counter may be varied, depending upon the angularity or curvature of the plane on which the skiving is performed. It is thus seen that the present invention affords the advantage of enabling the realization of varying degrees of flexibility in the back wall of the counter, especially the upper portion of the back wall.

The counter hereof may in its molded or finished form be incorporated into a shoe, as ordinarily. Thus, it is shown in Figures 6 and 7 with its bottom or heel flange inturned and seated on the heel portion 21 of an insole and with its upstanding back and side walls 15 and 16 positioned as usual in between the shoe upper 22 and the lining fabric 23. Because the feather edge of the counter hereof is composed of the flexible ply material, it does not tend to raise a ridge in the shoe lining or discomfort the foot no matter whether the counter is molded with the flexible ply material lying next to the foot or with the stiff ply material lying next to the foot. Accordingly, the counter hereof may be molded or used in either of the latter two ways.

Sheets of various origins or compositions may serve as the materials of construction for the counters hereof. For instance, leather and leatherboard may be either the flexible or stiff plies, so long as the leather or leatherboard has the degree of stiffness or flexibility required for either or both such plies. In some instances, leather of the proper pliancy or flexibility may be the flexible ply material and comparatively stiff fiberboard or leatherboard may be the stiff ply material. In lieu of leather, artificial leather, such as a rubber-impregnated fibrous base, may serve as the flexible ply material, whereas comparatively stiff fiberboard, leatherboard, or leather may serve as the stiff ply material. All of the enumerated materials, including such interfelted fiber base materials as fiberboard, leatherboard, and suitably impregnated interfelted fiber bases, may be used to good advantage in making the counters hereof, for they are readily skivable and do not tend to fray or ravel at their edges when skived. It might be noted that an absorptive fibrous web of the sort produced on papermaking machinery may be impregnated with rubber latex composition and then dried to produce an artificial leather product of the type available on the market under the trade-mark "Onco" and admirably adapted, because of its more or less stretchable and compressible qualities and its other characteristics, for use as the flexible ply material herein; and such artificial leather may be adhesively united or plied with comparatively stiff fiberboard to produce at low cost plied sheet material from which counters embodying the present invention may advantageously be fabricated. When the bottom edge of the counter blank hereof is skived to consist largely of suitably compressible as well as stretchable flexible ply material, such as the rubber-impregnated felted fiber ply known on the market under the trade-mark "Onco", the tendency toward developing irregular crimps or pleats in the bottom flange of the resulting molded counter is minimized and such irregular crimps or pleats as may be formed therein are easily removed by ironing or compressing the flange, especially when the flange contains the usual bottom-edge notches $n$ for accommodating any bunches or other irregularities.

It is to be understood that counters embodying the present invention may depart more or less from the specific embodiment hereinbefore described. Thus, the invention hereof may be embodied in a counter for a stitch-down shoe, in which case the bottom flange of the counter is turned outwardly rather than inwardly. It is to be understood, therefore, that the present invention is to be construed as broadly as the prior art permits from the appended claims.

I claim:

1. A shoe counter skived at its marginal portions and locally at its back wall over a zone extending from its upper edge much farther inwardly.

2. A shoe counter skived at its marginal portions and locally at its back wall over a relatively narrow zone extending from its upper edge much farther inwardly.

3. A shoe counter equipped with a bottom flange and skived at its marginal portion and locally at its back wall over a relatively narrow zone extending downwardly from its upper edge to a point removed but a relatively short distance from the bottom flange.

4. A shoe counter comprising a relatively stiff layer and a relatively flexible layer and skived on said relatively stiff layer at its marginal portions and locally at its back wall over a zone extending from its upper edge much farther inwardly.

5. A shoe counter comprising a relatively stiff layer and a relatively flexible layer and skived on said relatively stiff layer at its marginal portions and locally at its back wall over a relatively narrow zone extending from its upper edge much farther inwardly.

6. A shoe counter comprising a relatively stiff fiberboard ply and a relatively flexible rubber-impregnated felted fiber ply and skived on said fiberboard ply at its marginal portions and locally at its back wall over a zone extending from its upper edge much farther inwardly, said counter being equipped with a bottom flange and said zone of skiving at its back wall extending downwardly to a point removed but a relatively short distance from said bottom flange.

ETHEL W. MACLEAN.